(12) United States Patent
Yoshino et al.

(10) Patent No.: US 9,303,173 B2
(45) Date of Patent: Apr. 5, 2016

(54) ACTIVE ENERGY RAY-CURABLE INK, INK CARTRIDGE CONTAINING INK, IMAGE OR CURED PRODUCT FORMING METHOD, AND IMAGE OR CURED PRODUCT FORMING DEVICE

(71) Applicants: Mie Yoshino, Kanagawa (JP); Takao Hiraoka, Kanagawa (JP); Shizuka Kohzuki, Kanagawa (JP)

(72) Inventors: Mie Yoshino, Kanagawa (JP); Takao Hiraoka, Kanagawa (JP); Shizuka Kohzuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/704,205

(22) Filed: May 5, 2015

(65) Prior Publication Data

US 2015/0232675 A1  Aug. 20, 2015

Related U.S. Application Data

(63) Continuation of application No. 14/474,781, filed on Sep. 2, 2014, now Pat. No. 9,051,481.

(30) Foreign Application Priority Data

Sep. 17, 2013  (JP) ................................. 2013-191371
Jul. 7, 2014    (JP) ................................. 2014-139483

(51) Int. Cl.
  *G01D 11/00*    (2006.01)
  *B41J 2/01*     (2006.01)
  (Continued)

(52) U.S. Cl.
  CPC .............. *C09D 11/101* (2013.01); *C09D 11/30* (2013.01)

(58) Field of Classification Search
  CPC .............. B41J 2/01; B41J 2/0057; B41J 2/17; B41M 5/47; B41M 7/0045; B41M 7/81; B41M 5/0047; B41M 7/0081; B41M 7/0054; C09D 11/00; C09D 11/02; C09D 11/30; C09D 11/38; C09D 11/40; C09D 11/101; C09D 123/10; C09D 123/18; C09D 11/322

USPC ........ 347/86, 100, 102; 106/31, 31.33, 31.96, 106/31.13, 31.6; 522/168, 172, 178, 909; 523/160, 161
  See application file for complete search history.

(56) References Cited

U.S. PATENT DOCUMENTS 7,713,462 B2 *  5/2010  Hayata ................. C09D 11/101
                                                        264/447
8,299,142 B2   10/2012  Yokoi
(Continued)

FOREIGN PATENT DOCUMENTS

EP    1826005 A1    8/2007
EP    1 967 557 A1  9/2008
(Continued)

OTHER PUBLICATIONS

Search Report issued Dec. 3, 2014 in European Patent Application No. 14184974.

(Continued)

*Primary Examiner* — Anh T.N. Vo
(74) *Attorney, Agent, or Firm* — Oblon, McClelland, Maier & Neustadt, L.L.P.

(57) ABSTRACT

An active energy ray-curable ink which contains: polymerizable compounds containing a monofunctional polymerizable monomer a homopolymer of which has Tg of 90° C. or higher, wherein a cured product obtained by forming a coating film having an average thickness of 10 μm on a polycarbonate substrate using the ink, and 15 seconds later, and applying active energy rays having a light quantity of 1,500 mJ/cm² to the coating film to cure satisfies the following (1) and (2):
(1) a stretchability of the cured product represented by the following equation is 2 or greater, when the cured product is stretched by a tensile tester at a tensile speed of 20 mm/min, and temperature of 180° C., and Stretchability=(length after tensile test)/(length before tensile test)

(2) adhesion between the substrate and the cured product as measured by a cross-cut test in accordance with JIS K5400 is 70 or greater.

20 Claims, 2 Drawing Sheets

(51) Int. Cl.
*C09D 11/101* (2014.01)
*C09D 11/30* (2014.01)

(56) References Cited

U.S. PATENT DOCUMENTS

| | | | |
|---|---|---|---|
| 8,361,603 B2 * | 1/2013 | Yokoi | C09D 11/101 427/500 |
| 9,051,481 B2 | 6/2015 | Yoshino | |
| 2006/0052477 A1 | 3/2006 | Kessel et al. | |
| 2006/0154082 A1 | 7/2006 | Miller et al. | |
| 2009/0087626 A1 * | 4/2009 | Hayata | C09D 11/101 428/195.1 |
| 2009/0099277 A1 | 4/2009 | Nagvekar et al. | |
| 2009/0117286 A1 * | 5/2009 | Ishikawa | B41M 5/0023 427/511 |
| 2009/0171007 A1 | 7/2009 | Jonai et al. | |
| 2010/0080907 A1 | 4/2010 | Yamashita et al. | |
| 2011/0159251 A1 | 6/2011 | Sato et al. | |
| 2013/0260092 A1 | 10/2013 | Araki et al. | |

FOREIGN PATENT DOCUMENTS

| | | |
|---|---|---|
| EP | 2 228 416 A1 | 9/2010 |
| EP | 2 371 910 A1 | 10/2011 |
| EP | 2 644 664 A1 | 10/2013 |
| JP | 2000-38531 A | 2/2000 |
| JP | 2003-145573 A | 5/2003 |
| JP | 2004-516354 A | 6/2004 |
| JP | 2006-518781 A | 8/2006 |
| JP | 4214141 | 11/2008 |
| JP | 4310355 | 5/2009 |
| JP | 2010-132780 A | 6/2010 |
| JP | 2010-222385 | 10/2010 |
| JP | 2011-052107 | 3/2011 |
| JP | 4715752 | 4/2011 |
| JP | 4865483 | 11/2011 |
| JP | 4899430 | 1/2012 |
| JP | 2012-214603 A | 11/2012 |
| JP | 2013-57043 A | 3/2013 |
| JP | 2013-095910 | 5/2013 |
| JP | 5265916 | 5/2013 |
| JP | 2013-227515 A | 11/2013 |
| WO | WO 02/085638 A1 | 10/2002 |
| WO | WO 03/010249 A1 | 2/2003 |
| WO | WO 2007/055332 A1 | 5/2007 |
| WO | WO 2013/069580 A1 | 5/2013 |

OTHER PUBLICATIONS

Office Action issued Nov. 10, 2015 in Japanese Patent Application No. 2014-152731.

Office Action mailed Oct. 22, 2015, in co-pending U.S. Appl. No. 14/858,658.

* cited by examiner

ACTIVE ENERGY RAY-CURABLE INK, INK CARTRIDGE CONTAINING INK, IMAGE OR CURED PRODUCT FORMING METHOD, AND IMAGE OR CURED PRODUCT FORMING DEVICE

CROSS REFERENCE TO RELATED APPLICATIONS

The present application is a Continuation of U.S. application Ser. No. 14/474,781, filed Sep. 2, 2014, now U.S. Pat. No. 9,051,481, and claims priority to each of Japanese patent application JP 2013-191371, filed Sep. 17, 2013, and Japanese patent application JP 2014-139483, filed Jul. 7, 2014.

BACKGROUND OF THE INVENTION

1. Field of the Invention

The present invention relates to an active energy ray-curable ink, an ink cartridge containing an ink, an image or cured product forming method, and an image or cured product forming device.

2. Description of the Related Art

Conventionally, an active energy ray-curable ink has been provided to and used for offset printing, silk screen printing, and a top coating agent. In view of merits, such as cost-down through a simplified drying step, or reduction in an amount of a solvent evaporated considering the environment, a usage amount of the active energy ray-curable ink has recently been increased.

As for industrial use, an active energy ray-curable ink has recently been often used for printing on a substrate that is processed. Accordingly, as well as adhesion of an image (cured product) with a substrate, hardness, processability (stretchability, punching processability), and abrasion resistance are required for the image (cured product) obtained with the active energy ray-curable ink.

In most of cases, however, the cured film of the conventional active energy ray-curable ink is hard but brittle. For example, proposed is an ink composition, which has excellent curing ability, and forms an image having excellent blocking resistance, and extensibility (see Japanese Patent Application Laid-Open (JP-A) No. 2010-222385).

Moreover, disclosed is an energy ray-curable ink composition, which is low in viscosity without using a diluent solvent, realizes excellent printing quality to an non-absorbent recording medium, and has especially excellent adhesion to a recording medium (see Japanese Patent (JP-B) No. 4214141).

Moreover, proposed is a method for producing a print using an ink composition for fabrication, which gives a cured product that has high flexibility, and strength resistant to a forming process (see JP-B No. 4865483).

Furthermore, provided is an ink, which contains two monofunctional radical polymerizable monomers, and cyclodextrin or a derivative thereof for achieving desirable adhesion, tackiness, and formability (see JP-B No. 4310355).

Furthermore, provided is an active energy ray-curable ink for ink jet, which gives a coating film having flexibility, and has excellent curability and adhesion (see JP-B No. 4899430).

As for an active energy ray-curable ink for use that requires processability, an active energy ray-curable ink, which provides a cured product having adhesion to a substrate, hardness, and stretchability, has not yet been provided. Therefore, it is desired to promptly provide such an active energy ray-curable ink.

SUMMARY OF THE INVENTION

The present invention aims to provide an active energy ray-curable ink, which can give a cured product having desirable adherence to a substrate, hardness, and stretchability.

As means for solving the aforementioned problem, the active energy ray-curable ink of the present invention contains:

polymerizable compounds, wherein the polymerizable compounds contain a monofunctional polymerizable monomer a homopolymer of which has glass transition temperature of 90° C. or higher, and wherein a cured product obtained by forming a coating film having the average thickness of 10 μm on a polycarbonate substrate using the active energy ray-curable ink, and 15 seconds later, and applying active energy rays having a light quantity of 1,500 mJ/cm$^2$ to the coating film to cure satisfies the following conditions (1) and (2):

(1) a stretchability of the cured product, which is represented by the following equation, is 2 or greater, when the cured product is stretched by means of a tensile tester at a tensile speed of 20 mm/min, and temperature of 180° C., and Stretchability=(length after a tensile test)/(length before the tensile test)

(2) adhesion between the polycarbonate substrate and the cured product as measured by a cross-cut test in accordance with JIS K5400 is 70 or greater.

The present invention can solve the aforementioned various problems in the art, achieve the aforementioned object, and provide an active energy ray-curable ink, which can give a cured product having desirable adherence to a substrate, hardness, and stretchability.

Figure 1:
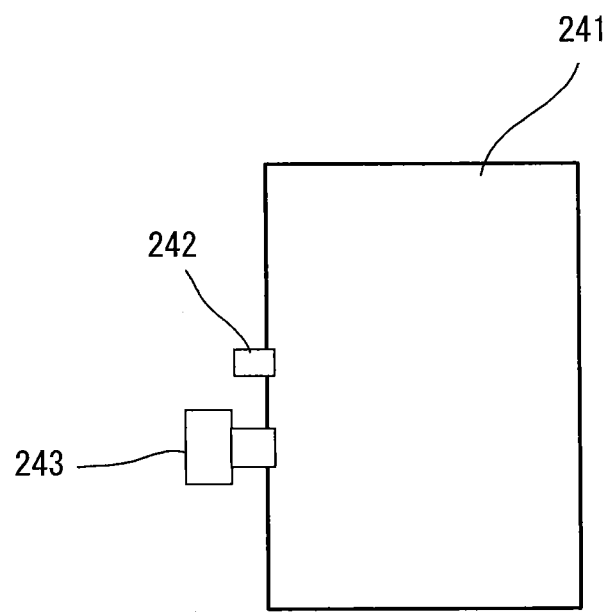
FIG. 1 is a schematic diagram illustrating one example of an ink cartridge filled with an ink.

DETAILED DESCRIPTION OF THE INVENTION (Active Energy Ray-Curable Ink)

The active energy ray-curable ink of the present invention enables to provide a cured produce, which is excellent in all of adhesion to a substrate, hardness, and stretchability, which have been difficult to realize at the same time, and moreover has excellent punching processability, by using a combination of certain polymerizable compounds, which are described later. Moreover, the active energy ray-curable ink of the present invention can be used as an inkjet ink that is required to be low in viscosity.

As for the active energy ray-curable ink of the present invention, stretchability of a cured product of the active energy ray-curable ink obtained by forming a coating film having the average thickness of 10 μm with the ink on a polycarbonate substrate, and applying active energy rays having a light quantity of 1,500 mJ/cm$^2$ to the coating film to cure the coating film, is 2 or greater, preferably 3 or greater, when the cured product is stretched by means of a tensile tester at a tensile speed of 20 mm/min, and temperature of 180° C., where the stretchability is represented by the following equation:

Stretchability=(length after a tensile test)/(length before the tensile test)

Moreover, the active energy ray-curable ink of the present invention can dissolve a polycarbonate substrate. Whether or not the ink can dissolve the polycarbonate substrate can be confirmed by the potting test described below. Specifically, one droplet of the active energy ray-curable ink is dropped on a surface of the polycarbonate substrate using a dropping pipette. Fifteen seconds later, the active energy ray-curable ink is wiped with a wiper (BEMCOT M-3II, manufactured by Asahi Kasei Fibers Corporation) that hardly releases fibers. Then, whether or not the ink has dissolved the polycarbonate substrate is judged by visually observing the surface of the polycarbonate substrate under a 25× magnifier (Peak pocket microscope 25×, manufactured by Tokai Sangyo Co., Ltd.), and touching the surface thereof by fingers.

The adhesion of the cured product of the active energy ray-curable resin to the polycarbonate substrate is related to solubility of the substrate to the active energy ray-curable ink. A cured product of an active energy ray-curable ink having a high ability of dissolving a polycarbonate substrate has high adhesion to the polycarbonate substrate. In this case, the ability of the ink for dissolving the polycarbonate substrate is also influenced by a type of a polymerizable monomer for use, an amount thereof, and duration for the contact between the ink and the substrate. Specifically, in the case where the time from when the ink is brought into contact with the polycarbonate substrate to when the ink is cured is relatively long, an influence of a type of a polymerizable monomer for use and an amount thereof is less notable. In the case where an image forming speed is fast, i.e., the time from when the ink is brought into contact with the polycarbonate substrate to when the ink is cured is short, however, an influence of a type of a polymerizable monomer for use and an amount thereof tends to be more significant.

Accordingly, adhesion between a polycarbonate substrate and a cured product of the active energy ray-curable ink is 70 or greater, preferably 80 or greater, and more preferably 95 or greater, where the cured product is obtained by forming a coating film of the ink having the average thickness of 10 μm on the polycarbonate substrate, and 15 seconds later, and applying active energy rays having a light quantity of 1,500 mJ/cm$^2$ to cure the coating film, and where the adhesion is measured on the cured product by a cross-cut test in accordance with JIS K5400. In view of production efficiency, the aforementioned adhesion range is preferably satisfied also when the time from the formation of the coating film to application of active energy rays is set to 5 seconds.

<Polymerizable Compounds>

The polymerizable compounds are each a compound that causes a polymerization reaction upon application of active energy rays (e.g. ultraviolet rays, and electron rays) to cure. In the present invention, the polymerizable compounds contain a monofunctional polymerizable monomer a homopolymer of which has glass transition temperature of 90° C. or higher. The polymerizable compounds preferably contain, as the monofunctional polymerizable monomer, a combination of a first monomer a homopolymer of which has glass transition temperature of 90° C. or higher, and a second monomer capable of dissolving a polycarbonate substrate, or contain a third monomer a homopolymer of which has glass transition temperature is 90° C. or higher, and which is capable of dissolving a polycarbonate substrate.

It is possible to attain a cured product having high stretchability, high adhesion, and high hardness, by using the aforementioned monofunctional polymerizable monomers in combination.

<First Monomer>

The first monomer is appropriately selected depending on the intended purpose without any limitation, provided that a homopolymer formed of the monomer has the glass transition temperature (Tg) of 90° C. or higher. Examples of the first monomer include hydroxyethyl(meth)acrylamide, isobornyl (meth)acrylate, adamantyl (meth)acrylate, 2-methyl-2-adamantyl (meth)acrylate, (meth)acryloylmorpholine, dimethylaminopropylacrylamide, dicyclopentenyl (meth)acrylate, dicyclopentanyl (meth)acrylate, and dicyclopentenyloxyethyl(meth)acrylate. These may be used alone, or in combination. Among them, preferred is a monomer having a cyclic structure.

As for the monomer having a cyclic structure, for example, particularly preferred are isobornyl (meth)acrylate having an isobornyl ring, and adamantyl (meth)acrylate having an adamantly ring. When the monomer having a cyclic structure is blended in an ink composition, strength or rigidness can be provided to a cured product obtained by curing the ink. Therefore, pencil hardness thereof is improved. Moreover, adhesion is improved, although mechanism thereof is not clear. It is assumed that the adhesion is improved, because a plain of the cyclic structural part is adhered to a substrate to increase van der Waars force.

The glass transition temperature (Tg) of a homopolymer of the first monomer means glass transition temperature of a cured product of a homopolymer of the first monomer. When a value of the glass transition temperature (Tg) of a monomer is present in a manufacturer's catalog, the value thereof is used. When the value thereof is not present in a catalog, the glass transition temperature (Tg) is a value measured by differential scanning calorimetry (DSC).

An amount of the first monomer is preferably 50% by mass or greater, more preferably 50% by mass to 70% by mass, and even more preferably 50% by mass to 60% by mass, relative to a total amount of the polymerizable compounds. When the amount thereof is 50% by mass or greater, strength or rigidness can be provided to a cured product obtained by curing the ink, and therefore an advantage, that is an improvement of pencil hardness, is easily attained.

<Second Monomer>

The second monomer is a monomer capable of dissolving, particularly, a polycarbonate substrate, and use of the second monomer improve adhesion with the substrate.

The second monomer is appropriately selected depending on the intended purpose without any limitation, provided that it is capable of dissolving the substrate. Examples of the second monomer include tetrahydrofurfuryl (meth)acrylate, cyclohexyl (meth)acrylate, benzyl (meth)acrylate, (meth) acryloylmorpholine, dimethylaminopropyl(meth)acrylamide, (cyclohexanespiro-2-(1,3-dioxolan-4-yl))methylacrylate (CHDOL-10, manufactured by Osaka Organic Chemical Industry Ltd.)), (2-methyl-2-ethyl-1,3-dioxolan-4-yl)methylacrylate (MEDOL-10, manufactured by Osaka Organic Chemical Industry Ltd.), and 4-acryloyloxymethyl-2-cyclohexyl-1,3-dioxolane. These may be used alone, or in combination.

Whether or not the second monomer can dissolve a substrate can be confirmed by the potting test described below. Specifically, one droplet of the second monomer is dropped on a surface of a polycarbonate substrate or a surface of a substrate for use, using a dropping pipette. After a certain period passed, the second monomer is wiped with a wiper (BEMCOT M-3II, manufactured by Asahi Kasei Fibers Corporation) that hardly releases fibers. Whether or not the polycarbonate substrate or the substrate for use is dissolved can be judged by visual observation and touching with fingers. Note that, the aforementioned certain time is appropriately set depending on the desired productivity and adhesion, and a monomer and substrate for use. The shorter the time is, more efficiently an image or cured product having high adhesion to a substrate can be attained.

An amount of the second monomer is preferably 30% by mass or greater, more preferably 30% by mass to 50% by mass, and even more preferably 40% by mass to 50% by mass, relative to a total amount of the polymerizable compounds. When the amount thereof is 30% by mass or greater, a substrate is sufficiently dissolved, and therefore an advantage that adhesion of the cured product to the substrate is secured can be easily attained.

<Third Monomer>

The third monomer is a monomer a homopolymer of which has glass transition temperature (Tg) is 90° C. or higher, and which is capable of dissolving particularly a polycarbonate substrate.

Examples of the third monomer include (meth)acryloylmorpholine, and dimethylaminopropyl(meth)acrylamide. These may be used alone, or in combination. Among them, a monomer having a cyclic structure is preferable.

As for the monomer having a cyclic structure, there is (meth)acryloylmorpholine. By blending the monomer having a cyclic structure into an ink composition, strength and rigidness can be provided to a cured product obtained by curing the ink. Therefore, pencil hardness thereof is improved. Moreover, adhesion thereof is improved, although mechanism for this is not clear. It is assumed that the adhesion is improved, because a plain of the cyclic structural part is adhered to a substrate to increase van der Waars force.

The glass transition temperature (Tg) of homopolymer of the third monomer can be measured by differential scanning calorimetry (DSC), in the same manner as with the first monomer.

Whether or not the third monomer can dissolve a substrate can be judged in the same manner to the second monomer.

An amount of the third monomer is preferably 30% by mass or greater, more preferably 50% by mass or greater, relative to a total amount of the polymerizable compounds. Note that, the third monomer is a monomer that can function as both the first monomer and the second monomer. In the case where the third monomer is in combination with the first monomer and/or the second monomer, therefore, the first monomer, the second monomer, and the third monomer are preferably contained in amounts that a monofunctional monomer a homopolymer of which has glass transition temperature (Tg) of 90° C. or higher is 50% by mass or greater, and an amount of a monofunctional monomer capable of dissolving a polycarbonate substrate is 30% by mass or greater.

The monomer containing a hydroxyl group is preferably not used as the monofunctional polymerizable monomer in order to attain desirable tackiness of an image or cured product obtained with the active energy ray-curable ink of the present invention. In the case where the monomer containing a hydroxyl group is used as the monofunctional polymerizable monomer, however, an amount thereof is preferably 15% by mass or less, more preferably 10% by mass or less, and even more preferably 5% by mass or less, relative to a total amount of the polymerizable compounds.

Examples of the monofunctional polymerizable monomer containing a hydroxyl group include hydroxyethyl (meth) acrylamide, and 4-hydroxybutyl (meth)acrylate.

As for the polymerizable compounds, other than the aforementioned monofunctional polymerizable monomers, a polyfunctional monomer or oligomer can also be used.

—Polyfunctional Monomer—

Examples of the polyfunctional monomer include neopentyl glycol di(meth)acrylate, (poly)ethylene glycol di(meth) acrylate, diethylene glycol di(meth)acrylate, triethylene glycol di(meth)acrylate, tetraethylene glycol di(meth)acrylate, polypropylene glycol di(meth)acrylate, (poly)tetramethylene glycol di(meth)acrylate, bisphenol A propylene oxide (PO) adduct di(meth)acrylate, ethoxylated neopentyl glycol di(meth)acrylate, propoxylated neopentyl glycol di(meth) acrylate, bisphenol A ethylene oxide (EO) adduct di(meth) acrylate, EO-modified pentaerythritol tri(meth)acrylate, PO-modified pentaerythritol tri(meth)acrylate, EO-modified pentaerythritol tetra(meth)acrylate, PO-modified pentaerythritol tetra(meth)acrylate, EO-modified dipentaerythritol tetra (meth)acrylate, PO-modified dipentaerythritol tetra(meth) acrylate, EO-modified trimethylol propane tri(meth)acrylate, PO-modified trimethylol propane tri(meth)acrylate, EO-modified tetramethylol methane tetra(meth)acrylate, PO-modified tetramethylol methane tetra(meth)acrylate, pentaerythritol tri(meth)acrylate, pentaerythritol tetra(meth) acrylate, dipentaerythritol tetra(meth)acrylate, trimethylol propane tri(meth)acrylate, tetramethylol methane tetra(meth) acrylate, trimethylol ethane tri(meth)acrylate, trimethylol propane tri(meth)acrylate, bis(4-(meth)acryloxypolyethoxyphenyl)propane, diallyl phthalate, triallyl trimellitate, 1,6-hexanediol di(meth)acrylate, 1,9-nonanediol di(meth)acrylate, 1,3-butylene glycol di(meth)acrylate, 1,10-decanediol di(meth)acrylate, hydroxypivalic acid neopentyl glycol di(meth)acrylate, tetramethylol methane tri(meth)acrylate, dimethylol tricyclodecane di(meth)acrylate, modified glycerin tri(meth)acrylate, bisphenol A glycidyl ether (meth) acrylic acid adduct, modified bisphenol A di(meth)acrylate, caprolactone-modified dipentaerythritol hexa(meth)acrylate, dipentaerythritol hexa(meth)acrylate, pentaerythritol tri (meth)acrylate tolylene diisocyanate urethane prepolymer, pentaerythritol tri(meth)acrylate hexamethylene diisocyanate urethane prepolymer, ditrimethylol propane tetra (meth) acrylate, and pentaerythritol tri(meth)acrylate hexamethylene diisocyanate urethane prepolymer. These may be used alone, or in combination. Among them, preferred is a bifunctional to pentafunctional monomer, and more preferred is a bifunctional monomer.

An amount of the polyfunctional monomer is preferably 1% by mass to 10% by mass, more preferably 1% by mass to 5% by mass, relative to a total amount of the polymerizable compounds in order to attain excellent pinching processability, and excellent stretchability.

—Oligomer—

The oligomer is appropriately selected depending on the intended purpose without any limitation, but urethane oligomer is preferably used. As for the urethane oligomer, a commercial product can be used. Examples of the commercial product thereof include: UV-2000B, UV-2750B, UV-3000B, UV-3010B, UV-3200B, UV-3300B, UV-3700B, UV-6640B, UV-8630B, UV-7000B, UV-7610B, UV-1700B, UV-7630B, UV-6300B, UV-6640B, UV-7550B, UV-7600B, UV-7605B, UV-7610B, UV-7630B, UV-7640B, UV-7650B, UT-5449, UT-5454, all manufactured by, Nippon Synthetic Chemical Industry Co., Ltd.; CN929, CN961E75, CN961H81, CN962, CN963, CN963A80, CN963B80, CN963E75, CN963E80, CN963J85, CN965, CN965A80, CN966A80, CN966H90, CN966J75, CN968, CN981, CN981A75, CN981B88, CN982, CN982A75, CN982B88, CN982E75, CN983, CN985B88, CN9001, CN9002, CN9788, CN970A60, CN970E60, CN971, CN971A80, CN972, CN973A80, CN973H85, CN973J75, CN975, CN977C70, CN978, CN9782, CN9783, CN996, CN9893, all manufactured by TOMOE ENGINEERING CO., LTD.; and EBECRYL210, EBECRYL220, EBECRYL230, EBECRYL270, KRM8200, EBECRYL5129, EBECRYL8210, EBECRYL8301, EBECRYL8804, EBECRYL8807, EBECRYL9260, KRM7735, KRM8296, KRM8452, EBECRYL4858, EBECRYL8402, EBECRYL9270, EBECRYL8311, EBECRYL8701, all manufactured by DAICEL-ALLNEX LTD. These may be used alone, or in combination. Among them, those having 2 to 5 unsaturated carbon-carbon bonds are preferable. In view of excellent punching processability, those having 2 unsaturated carbon-carbon bonds are more preferable.

The weight average molecular weight of the urethane oligomer is preferably 5,000 to 13,000, more preferably 10,000 to 13,000. When the weight average molecular weight thereof is 5,000 or greater, even better stretchability can be attained. When the weight average molecular weight thereof is 13,000 or smaller, suitability of the ink as an inkjet is enhanced in terms of the viscosity.

The weight average molecular weight is a weight average molecular weight based on a standard polystyrene molecular weight conversion. The weight average molecular weight is measured by means of high performance liquid chromatography ("Waters 2695 (main body)," and "Waters 2414 (detector)," both manufactured by Nihon Waters K.K.) with three columns Shodex GPC KF-806L (elimination limit molecule quantity: $2 \times 10^7$, separation range: 100 to $2 \times 10^7$, theoretical plate number: 10,000 plate/column, filler material: styrene-divinylbenzene copolymer, filler particle diameter: 10 μm) provided in series.

In order to attain excellent inkjet jetting stability, adhesion, and punching processability, an amount of the oligomer is preferably 5% by mass to 20% by mass, more preferably 5% by mass to 15% by mass, relative to a total amount of the polymerizable compounds.

<Photopolymerization Initiator>

It has been known that, for example, a (meth)acrylate compound, a (meth)acrylamide compound, and a vinyl ether compound, which can be served as the photopolymerization initiator, are also cationic polymerizable. The photo-cationic polymerization initiator is typically expensive, and generates a trace of strong acid even when light is applied. When such a polymerization initiator is used, special cares, such as providing acid resistance to an ink supply channel in an image forming apparatus, need to be paid. Therefore, there is a limitation in a selection of members constituting an image forming apparatus. Compared to the above, a photopolymerization initiator, which is low at cost and does not generate strong acid, can be used in the active energy ray-curable ink of the present invention, and therefore an ink can be produced at low cost, and a selection of members of an image forming apparatus is easy. In the case where a very high energy light source is used, such as electron rays, α rays, β rays, γ rays or X rays, a polymerization reaction can of course proceed without a polymerization initiator. This is a conventionally known matter, and thus the details are not particularly described here.

Examples of the photopolymerization initiator include a self-cleaving photopolymerization initiator, and a hydrogen-abstracting photopolymerization initiator.

Examples of the self-cleaving photopolymerization initiator include 2,2-dimethoxy-1,2-diphenylethan-1-one, 1-hydroxycyclohexyl phenylketone, 2-hydroxy-2-methyl-1-phenylpropan-1-one, 1-[4-(2-hydroxyethoxy)-phenyl]-2-hydroxy-2-methyl-1-propan-1-one, 2-hydroxy-1-{4-[4-(2-hydroxy-2-methylpropionyl)benzyl]phenyl}-2-methyl-1-propan-1-one, oligo[2-hydroxy-2-methyl-1-[4-(1-methylvinyl)phenyl]propanone, phenylglyoxylic acid methyl ester, 2-methyl-1-[4-(methylthio)phenyl]-2-morpholinopropan-1-one, 2-benzyl-2-dimethylamino-1-(4-morpholinophenyl)butanone-1,2-dimethylamino-2-(4-methylbenzyl)-1-(4-morpholin-4-yl-phenyl)butan-1-one, bis(2,4,6-trimethylbenzoyl)phenylphosphine oxide, bis(2,6-dimethoxybenzoyl)-2,4,4-trimethyl-pentylphosphine oxide, 2,4,6-trimethylbenzoylphosphine oxide, 1,2-octanedion-[4-(phenylthio)-2-(o-benzoyloxime)], ethanone-1-[9-ethyl-6-(2-methylbenzoyl)-9H-carbazol-3-yl]-1-(O-acetyloxime), [4-(methylphenylthio)phenyl]phenylmethanone, and oligo [2-hydroxy-2-methyl-1-[4-(1-methylvinyl)phenyl]propanone. These may be used alone, or in combination.

Examples of the hydrogen-abstracting photopolymerization initiator include: a benzophenone-based compound, such as benzophenone, methylbenzophenone, methyl-2-benzoylbenzoate, 4-benzoyl-4'-methyldiphenyl sulfide and phenylbenzophenone; and a thioxanthone-based compound, such as 2,4-diethylthioxanthone, 2-chlorothioxanthone, isopropylthioxanthone and 1-chloro-4-propylthioxanthone. These may be used alone, or in combination.

An amount of the photopolymerization initiator is appropriately selected depending on the intended purpose without any limitation, but the amount thereof is preferably 1% by mass to 20% by mass, more preferably 5% by mass to 10% by mass, relative to a total amount of the polymerizable compounds.

<<Polymerization Accelerator>>

As for the polymerization accelerator, an amine compound may be used in combination with the photopolymerization initiator.

Examples of the amine compound include ethyl-p-dimethylaminobenzoate, 2-ethylhexyl-p-dimethylaminobenzoate, methyl p-dimethylaminobenzoate, 2-dimethylaminoethyl benzoate and butoxyethyl-p-dimethylaminobenzoate.

<Other Components>

Examples of other components include a colorant, a polymerization inhibitor, a surfactant, a photosensitizer, and a polar group-containing high molecular weight pigment dispersant.

<<Colorant>>

As for the colorant, conventional dyes or pigments can be used. As for the pigment, an inorganic pigment or organic pigment can be used. Note that, various inorganic pigments or organic pigments can be sued depending on physical properties of an ink.

Examples of a black pigment include carbon black produced by a furnace method or a channel method.

Examples of a yellow pigment include pigments of Pigment Yellow series, such as Pigment Yellow 1, Pigment Yellow 2, Pigment Yellow 3, Pigment Yellow 12, Pigment Yellow 13, Pigment Yellow 14, Pigment Yellow 16, Pigment Yellow 17, Pigment Yellow 73, Pigment Yellow 74, Pigment Yellow 75, Pigment Yellow 83, Pigment Yellow 93, Pigment Yellow 95, Pigment Yellow 97, Pigment Yellow 98, Pigment Yellow 114, Pigment Yellow 120, Pigment Yellow 128, Pigment Yellow 129, Pigment Yellow 138, Pigment Yellow 150, Pigment Yellow 151, Pigment Yellow 154, Pigment Yellow 155, and Pigment Yellow 180.

Examples of a magenta pigment include pigments of Pigment Red series, such as Pigment Red 5, Pigment Red 7, Pigment Red 12, Pigment Red 48(Ca), Pigment Red 48(Mn), Pigment Red 57(Ca), Pigment Red 57:1, Pigment Red 112, Pigment Red 122, Pigment Red 123, Pigment Red 168, Pigment Red 184, Pigment Red 202, and Pigment Violet 19.

Examples of a cyan pigment include pigments of Pigment Blue series, such as Pigment Blue 1, Pigment Blue 2, Pigment Blue 3, Pigment Blue 15, Pigment Blue 15:3, Pigment Blue 15:4, Pigment Blue 16, Pigment Blue 22, Pigment Blue 60, Vat Blue 4, and Vat Blue 60.

Examples of a white pigment include: sulfuric acid salts of alkaline earth metals such as barium sulfate; carbonic acid salts of alkaline earth metals such as calcium carbonate; silica such as fine silicic acid powder and synthetic silicic acid salts; calcium silicate; alumina; alumina hydrate; titanium oxide; zinc oxide; talc; and clay.

<<Polymerization Inhibitor>>

Examples of the polymerization inhibitor include 4-methoxy-1-naphthol, methylhydroquinone, hydroquinone, t-butylhydroquinone, di-t-butylhydroquinone, methoquinone, 2,2'-dihydroxy-3,3'-di($\alpha$-methylcyclohexyl)-5,5'-dimethyldiphenylmethane, p-benzoquinone, di-t-butylbutyl diphenylamine, 9,10-di-n-butoxyanthracene, and 4,4'-[1,10-dioxo-1,10-decanediylbis(oxy)]bis[2,2,6,6-tetramethyl]-1-piperidinyloxy.

<<Surfactant>>

The surfactant is appropriately selected depending on the intended purpose without any limitation, and examples thereof include a higher fatty acid-based surfactant, a silicone-based surfactant, and a fluorine-based surfactant.

The active energy ray-curable ink is preferably free from a diluent solvent. However, there is a case where it is difficult to eject the ink as an inkjet ink, because a viscosity of the ink is too high, when the polymerizable compound, the photopolymerization initiator, the colorant, etc., are blended. In such a case, a diluent solvent may be used to dilute the ink.

As for the diluent solvent, preferred is a solvent having a boiling point of 160° C. to 190° C. When the boiling point thereof is 160° C. to 190° C., advantages, such as curing ability is not impaired, and the ink is not solidified within an inkjet nozzle, can be attained.

Examples of the diluent solvent include ether, ketone, aromatic, xylene, ethyl ethoxypropionate, ethyl acetate, cyclohexanone, diethylene glycol monomethyl ether, diethylene glycol, monoethyl ether, $\gamma$-butyl lactone, ethyl lactate, cyclohexane methyl ethyl ketone, toluene, ethyl ethoxy propionate, polymethacrylate or propylene glycol monomethyl ether acetate, ethylene glycol monomethyl ether, diethylene glycol, and triethylene glycol monobutyl ether. These may be used alone, or in combination.

The viscosity of the active energy ray-curable ink of the present invention is preferably 3 mPa·s to 40 mPa·s, more preferably 3 mPa·s to 35 mPa·s, at 25° C. The viscosity thereof at 60° C. is preferably 7 mPa·s to 15 mPa·s, more preferably 10 mPa·s to 12 mPa·s.

The viscosity at 25° C. and the viscosity at 60° C. can be measured by a cone-plate rotor viscometer, VISCOMETER TV-22, manufactured by Toki Sangyo Co., Ltd., with setting temperature of constant-temperature circulating water to 25° C. and 60° C., respectively. As for the adjustment of the temperature of the circulating water, VISCOMATE VM-150III can be used. The temperature of 25° C. is specified based on a typical room environment, and the temperature of 60° C. is specified based on a specification of a commercially available heatable inkjet ejection head, such as GEN4, manufactured by Ricoh Industry Company, Ltd.

The static surface tension of the active energy ray-curable ink of the present invention at 25° C. is preferably 20 mN/m to 40 mN/m, more preferably 28 mN/m to 35 mN/m.

The static surface tension can be measured at 25° C. by means of a static surface tensiometer (CBVP-Z, manufactured by Kyowa Interface Science Co., Ltd.). The static surface tension is specified based on a specification of a commercially available inkjet ejection head, such as GEN4, manufactured by Ricoh Industry Company, Ltd.

In the case where the active energy ray-curable ink contains an inorganic pigment or organic pigment as a colorant, the average primary particle diameter of the pigment particles is preferably 20 nm to 200 nm, more preferably 50 nm to 160 nm. When the average primary particle diameter thereof is within the range of 20 nm to 200 nm, excellent lightfastness and precision of a print can be attained.

The primary particle diameter can be measured, for example, by means of an electron microscope (JEM-2010, manufactured by JEOL Ltd.).

(Ink Cartridge Containing Ink)

The ink cartridge of the present invention contains the active energy ray-curable ink of the present invention, and a container, and may further contain other members, such as an ink bag, according to the necessity. With this form, users do not have to directly touch the ink during operations such as exchange of an ink, and therefore it is not necessary to worry about staining their fingers, hands, or clothes. In addition, it is possible to prevent interfusion of foreign matter, such as dusts, into the ink.

The container is not particularly limited, and a shape, structure, size, and material thereof are appropriately selected depending on the intended purpose. For example, preferred is a container containing an ink bag formed of an aluminum laminate film, or a resin film.

Figure 2:
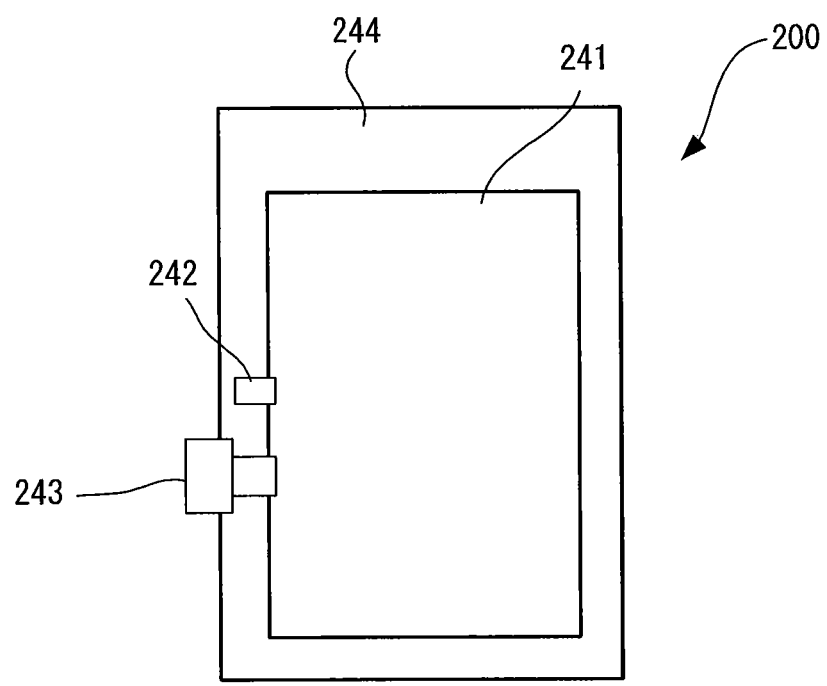
FIG. 2 is a schematic diagram of the ink cartridge of FIG. 1 including a case.

The ink cartridge containing the ink is explained with reference to FIGS. 1 and 2. FIG. 1 is a schematic diagram illustrating one example of an ink bag 241 of an ink cartridge, and FIG. 2 is a schematic diagram illustrating an ink cartridge 200, in which the ink bag 241 of FIG. 1 is housed in a cartridge case 244.

As illustrated in FIG. 1, the ink bag 241 is filled with the ink by injecting the ink from an ink inlet 242. After removing the air present inside the ink bag 241, the ink inlet 242 is sealed by fusion bonding. At the time of use, a needle attached to the main body of the device is inserted into an ink outlet 243 formed of a rubber member to supply the ink to the device. The ink bag 241 is formed of a wrapping member, such as an air non-permeable aluminum laminate film. As illustrated in FIG. 2, the ink bag 241 is typically housed in a plastic cartridge case 244, which is then detachably mounted in use to various image or cured product forming devices (inkjet recording devices) as the ink cartridge 200.

The ink cartridge containing the ink is preferably detachably mounted in an image or cured product forming device (inkjet recording device). As a result of this, refill or replacement of the ink can be simplified, and workability can be improved.

(Image or Cured Product Forming Method and Image or Cured Product Forming Device)

The image or cured product forming method of the present invention contains at least an ink ejecting step, and a curing step, and may further contain other steps according to the necessity.

The image or cured product forming device of the present invention contains at least an ink ejecting unit, and a curing unit, and may further contain other units according to the necessity.

The image or cured product forming method of the present invention can be suitably performed by the image or cured product forming device of the present invention. The ink ejecting step can be carried out by the ink ejecting unit, the curing step can be carried out by the curing unit, and the aforementioned other steps can be carried out by the aforementioned other units.

<Ink Ejecting Step and Ink Ejecting Unit>

The ink ejecting step is a step containing ejecting an active energy ray-curable ink onto a surface of a substrate through an inkjet recording system, and is performed by the ink ejecting unit.

Examples of the ink ejecting unit include a continuous jetting unit, and an on-demand unit.

Examples of the on-demand unit include an ink jetting unit employing a piezo system, a thermal system, or an electrostatic system.

<<Substrate>>

The substrate for use in the image or cured product forming method of the present invention is appropriately selected depending on the intended purpose without any limitation, and examples thereof include paper, plastic, metal, ceramic, glass, and a composite material thereof.

Among them, a non-permeable substrate is preferable, as the active energy ray-curable ink of the present invention is immediately cured upon application of light. More preferred is a plastic film or a plastic molded product, formed of polyethylene, polypropylene, polyethylene terephthalate, polycarbonate, an ABS resin, a polyvinyl chloride, polystyrene, any of other polyesters, polyamide, a vinyl-based material, an acrylic resin, or a composite material thereof.

In the case where polycarbonate or an ABS resin is used as the substrate, preferred are tetrahydrofurfuryl (meth)acrylate, cyclohexyl (meth)acrylate, benzyl (meth)acrylate, and (meth)acryloylmorpholine, in view of high solubility of the polycarbonate. In the case where acryl is used as the substrate, dimethylaminopropyl acrylamide is preferable in view of high solubility of the acryl resin.

<Curing Step and Curing Unit>

The curing step is a step containing applying active energy rays to the active energy ray-curable ink ejected onto the surface of the substrate to thereby cure the active energy ray-curable ink, and is carried out by the curing unit.

Examples of the curing unit include a UV radiation device.

<Other Steps and Other Units>

Examples of the aforementioned other steps and the aforementioned other units include a transporting step and a transporting unit, and a controlling step and a controlling unit.

Figure 3:
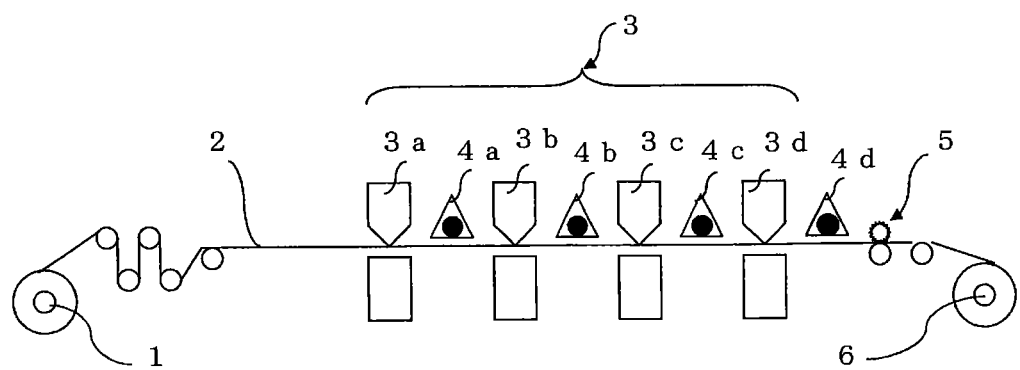
FIG. 3 is a schematic diagram illustrating one example of an image or cured product forming device (inkjet recording device).

FIG. 3 is a schematic diagram illustrating one example of the image or cured product forming device (inkjet recording device) of the present invention for use in the image or cured product forming method of the present invention.

FIG. 3 illustrate an example where a color cured product is formed by applying light (UV light) from a UV light source (curing light source) 4a, 4b, 4c, 4d per print of each color (yellow, magenta, cyan, or black) performed by ejecting an ink from a print unit 3 [composed of print units 3a, 3b, 3c, 3d of different colors (e.g., yellow, magenta, cyan, and black)] onto a print substrate 2 (transported from left to right in FIG. 3) supplied from a print substrate supply roll 1, to cure the ink. At an ink ejecting part of the printing unit 3a, 3b, 3c, 3d, a heating system to liquidize the active energy ray-curable ink is provided. At a substrate holding part thereof (upper or bottom part of the substrate in FIG. 3), a cooling system to optionally cool the substrate in a contact or non-contact manner. In the case where a print area of a color that is printed in advance is small and the travelling speed thereof is slow, the substrate is maintained at around room temperature. In the case where a print area of a color that is printed in advance is large, or the travelling speed thereof is fast, however, the temperature of the substrate is increased. Accordingly, a cooling system for maintaining the temperature of the substrate to around room temperature is optionally preferably provided.

Examples of the print substrate 2 include paper, a film, a metal, and a composite material thereof. Note that, the print substrate 2 in the form of a roll is illustrated in FIG. 3, but the print substrate 2 may be in the form of sheets. Moreover, printing may be performed not only on one side, but also on both sides of the substrate.

In high speed printing, high curability can be attained by applying UV rays every time when each color is printed. In addition to this, energy saving, and low cost can be also achieved, for example, by reducing light quantities of the UV light sources 4a, 4b, 4c, or omitting the UV light sources 4a, 4b, 4c, and applying a sufficient quantity of UV rays by 4d collectively after printing a plurality of colors to cure. Alternatively, a LED light source, which has been recently used on practice for printing an active energy ray-curable ink, can be used instead of conventional light sources, such as a high pressure mercury lamp, and a metal halide lamp.

Note that, in FIG. 3, 5 is a processing unit, and 6 is a print winding roll.

EXAMPLES

Examples of the present invention are explained hereinafter, but Examples shall not be construed as to limit the scope of the present invention in any way.

Examples 1 to 18 and Comparative Examples 1 to 5

Production of Active Energy Ray-Curable Ink

An active energy ray-curable ink was produced by blending a composition containing (A) to (F), and carbon black as depicted in Tables 1 to 7. Note that, (A) to (E) are polymerizable monomers, and the values of (A) to (E) each depict a value in % by mass relative to a total amount of the monomers ((A)+(B)+(C)+(D)+(E)) (F) is a photopolymerization initiator, and the values of (F) and the carbon black each depict a value in % by mass relative to 100% by mass of a total amount of the monomers ((A)+(B)+(C)+(D)+(E)).

Next, each of the polymerizable monomers used for the production of each active energy ray-curable ink was subjected to the measurements of glass transition temperature, and substrate dissolving ability of the monomer in the following manners.

<Measurement of Glass Transition Temperature (Tg)>

The glass transition temperature (Tg) of the polymerizable monomer indicates glass transition temperature of a cured product of a homopolymer of the polymerizable monomer. Here, the glass transition temperature (Tg) is a value described in a manufacturer's catalog of the polymerizable monomer. When the value thereof is not present in a catalog, the glass transition temperature (Tg) is a value measured by differential scanning calorimetry (DSC).

—Measuring Method of Glass Transition Temperature (Tg)—

Polymerization of a polymerizable monomer was carried out by a typical solution polymerization method.

A: 10% by mass polymerizable monomer toluene solution

B: 5% by mass of asobisisobutyronitrile as a polymerization initiator

A and B were placed in a test tube with purging with nitrogen gas, and the test tube was taken in a worm bath of 60° C. for 6 hours, to thereby synthesize a polymer. Thereafter, the polymer is redeposited with a solvent (e.g., methanol, and petroleum ether) that dissolved the polymerizable monomer but did not dissolve the polymer, followed by filtration to thereby take a polymer out. The obtained polymer was provided to DSC. As for the DSC device, DSC120U manufactured by Seiko Instruments Inc. was used. The measurement was performed at the measuring temperature of 30° C. to 300° C., and heating rate of 2.5° C./min.

<Substrate Dissolubility of Monomer>

Whether or not the polymerizable monomer could dissolve the substrate was confirmed by the potting test described below. Specifically, one droplet of the polymerizable monomer was dropped on a surface of the polycarbonate substrate or a surface of the substrate for use using a dropping pipette. Fifteen seconds later, the polymerizable monomer was wiped with a wiper (BEMCOT M-3II, manufactured by Asahi Kasei Fibers Corporation) that hardly released fibers. Then, whether or not the polymerizable monomer had dissolved the polycarbonate substrate or the substrate for use was judged by visually observing the surface of the polycarbonate substrate or the substrate for use under a 25× magnifier (Peak pocket microscope 25×, manufactured by Tokai Sangyo Co., Ltd.), and touching the surface thereof by fingers. A change in the surface of the substrate was confirmed with all of the polymerizable monomers of (B) and (C) depicted in Tables 1 to 7, and these polymerizable monomer could dissolve the substrate for use.

Next, each of the produced active energy ray-curable inks was evaluated in terms of Substrate dissolubility with the ink (15 seconds, 1 second), and viscosity of the ink (25° C., 60° C.) in the following manners. The results are presented in Tables 1 to 7.

<Substrate Dissolubility of Ink>

Each of the produced active energy ray-curable inks was dropped on a surface of the polycarbonate substrate or the substrate for use using a dropping pipette. One second later, or 15 seconds later, the active energy ray-curable ink was wiped with a wiper (BEMCOT M-3II, manufactured by Asahi Kasei Fibers Corporation) that hardly releases fibers. Whether or not the ink had dissolved the polycarbonate substrate or the substrate for use was judged by visually observing the surface of the polycarbonate substrate or the substrate for use under a 25× magnifier (Peak pocket microscope 25×, manufactured by Tokai Sangyo Co., Ltd.), and touching the surface thereof by fingers, based on the following evaluation criteria.

[Evaluation Criteria]

A: A surface texture of the area where the ink had been dropped and wiped was changed to the degree that irregularities could be felt with fingers, compared to the other area.

B: A surface texture of the area where the ink had been dropped and wiped was changed to the degree that cloudiness was observed in the area, compared to the other area.

C: No change was observed on the surface.

<Viscosity>

The viscosity was measured by means of a cone-plate rotor viscometer, VISCOMETER TV-22, manufactured by Toki Sangyo Co., Ltd., with setting the temperature of constant-temperature circulating water to 25° C., and 60° C., respectively. The unit of the viscosity was mPa·s, and VISCOMETER VM-150III (manufactured by Toki Sangyo Co., Ltd.) was used for adjusting the temperature.

Subsequently, a cured product was produced using each of the produced active energy ray-curable inks in the following manner.

<Production of Cured Product>

A solid coating film having a thickness of about 10 μm was formed by applying the ink on the following substrate by means of a wire bar (coil No. #6). To the coating film, active energy rays integral of light of which was 1,500 mJ/cm$^2$ in the wavelength range corresponding to the UV-A region (wavelength: 350 nm to 400 nm) were applied by means of a UV radiation device LH6 available from Noblelight Fusion, to cure the coating film, to thereby obtain a cured product. As for the obtained cured product, Cured Product 1 and Cured Product 2 were produced, where Cured Product 1 was the cured product with which the time from when the ink was applied to the substrate to when active energy rays were applied was 5 seconds, and Cured Product 2 was the cured product with which the aforementioned time was 15 seconds.

Substrate: polycarbonate film (PC) (Eupilon 100FE2000 masking, manufactured by Mitsubishi Engineering-Plastics Corporation, thickness: 100 μm)

Each of the obtained cured products was evaluated in terms of the adhesion to the substrate, pencil hardness, stretchability, and punching processability, in the following manners. The results are presented in Tables 1 to 7.

<Adhesion with Substrate>

The adhesion of Cured Product 1 and Cured Product 2 as produced was evaluated in accordance with a cross-cut test of JIS K5400 (former standard).

The adhesion being 100 means that none of cross-cut portions, which have been cross-cut into 100 pieces, has not been peeled. The adhesion being 70 means that the total area of the non-peeled portions was 70% relative to the entire area.

[Evaluation Criteria]

A: The adhesion was 95 to 100.

B: The adhesion was 70 to 94.

C: The adhesion was less than 70.

<Pencil Hardness>

Pencil hardness of produced Cured Product 2 was measured in accordance with the scratch hardness method (pencil method) as specified in JIS K5600-5-4.

<Stretchability>

The stretchability was evaluated with braking elongation (tensile test) at 180° C. Cured Product 2 as produced was subjected to the measurement by means of a tensile tester (Autograph AGS-5kNX, manufactured by Shimadza Corporation) at the tensile speed of 20 mm/min, and temperature of 180° C., with a sample (JIS K6251 Dumbell No. 6). The stretchability was represented with a ratio (length after tensile test)/(length before tensile test). The stretchability is preferably 2 or greater, more preferably 3 or greater.

<Punching Processability>

Cured Product 2 as produced was punched out by means of a punch (No. 150, manufactured by LION OFFICE PRODUCTS CORP.), and a state of the cut surface was observed under a microscope (pocket measuring microscope 25×, manufactured by Tokai Sangyo Co., Ltd.). The punching processability was evaluated based on the following criteria.

[Evaluation Criteria]

A: No crack was observed in the cut surface of the cured product.

B: A crack was partially observed in the cut surface of the cured product.

C: A significant crack was observed in the cut surface of the cured product.

TABLE 1

| Component | | Name of Component | Example 1 | Example 2 | Example 3 | Example 4 |
|---|---|---|---|---|---|---|
| A | 1 | Adamantly methacrylate | 50 | | | |
| | 2 | Adamantly acrylate | | 63 | | 50 |
| | 3 | Isobornyl acrylate | | | 50 | |
| | 4 | Hydroxyethyl acrylamide | | | | |
| A' | 1 | 1,3-butylene glycol diacrylate | | | | |
| B | 1 | Cyclohexyl methacrylate | | | | 50 |
| | 2 | Tetrahydrofurfuryl methacrylate | 50 | | | |
| | 3 | Cyclohexyl acrylate | | | | |
| | 4 | Benzyl acrylate | | 15 | | |
| | 5 | (2-methyl-2-ethyl-1,3-dioxoran-4-yl) methyl acrylate | | | | |
| | 6 | Tetrahydrofurfuryl acrylate | | 22 | | |
| C | 1 | Dimethylaminopropyl acrylamide | | | | |
| | 2 | Acryloyl morpholine | | | 50 | |
| C' | 1 | 3,3,5-trimethylcyclohexane acrylate | | | | |
| D | 1 | 4-hydroxybutyl acrylate | | | | |
| E | 1 | 1,9-nonanediol diacrylate | | | | |
| | 2 | Diethylene glycol diacrylate | | | | |
| Total of monomers (% by mass) | | | 100 | 100 | 100 | 100 |
| F | 1 | 1-hydroxycyclohexylphenyl ketone | 10 | | 10 | |
| | 2 | 2-dimethylamino-2-2(4-methylbenzyl)-1-(4-morpholin-4-yl-phenyl) butan-1-one | | 10 | | |
| | 3 | Oligo[2-hydroxy-2-methyl-1-[4-(1-methylvinyl)phenyl]propanone | | | | 10 |
| Colorant | | Carbon black | 4 | 4 | 4 | 4 |
| Substrate | | | PC | PC | PC | PC |
| Evaluation result | | Adhesion (15 seconds later UV radiation, curing) (number) | 100 A | 100 A | 100 A | 100 A |
| | | Adhesion (5 seconds later UV radiation, curing) (number) | 100 A | 100 A | 100 A | 60 C |
| | | Pencil hardness | H | F | F(H) | F |
| | | Stretchability | 3 | 3 | 3 | 3 |
| | | Punching processability | A | A | A | A |
| | | Substrate dissolubility (15 seconds) | A | A | A | A |
| | | Substrate dissolubility (1 second) | A | A | C | C |
| | | Viscosity 25° C. (mPa · s) | 12 | 17 | 12 | 18 |
| | | Viscosity 60° C. (mPa · s) | 5 | 6 | 5 | 7 |

TABLE 2

| Component | | Name of Component | Example 5 | Example 6 | Example 7 | Example 8 |
|---|---|---|---|---|---|---|
| A | 1 | Adamantly methacrylate | | | | |
| | 2 | Adamantly acrylate | | | | |
| | 3 | Isobornyl acrylate | 45 | 45 | 50 | |
| | 4 | Hydroxyethyl acrylamide | 5 | 10 | | 50 |
| A' | 1 | 1,3-butylene glycol diacrylate | | | | |
| B | 1 | Cyclohexyl methacrylate | | | | |
| | 2 | Tetrahydrofurfuryl methacrylate | | | | 50 |
| | 3 | Cyclohexyl acrylate | 41 | 36 | | |
| | 4 | Benzyl acrylate | | | | |
| | 5 | (2-methyl-2-ethyl-1,3-dioxoran-4-yl) methyl acrylate | | | | |
| | 6 | Tetrahydrofurfuryl acrylate | | | | |
| C | 1 | Dimethylaminopropyl acrylamide | | | 50 | |
| | 2 | Acryloyl morpholine | | | | |
| C' | 1 | 3,3,5-trimethylcyclohexane acrylate | | | | |
| D | 1 | 4-hydroxybutyl acrylate | 9 | 9 | | |
| E | 1 | 1,9-nonanediol diacrylate | | | | |
| | 2 | Diethylene glycol diacrylate | | | | |
| Total of monomers (% by mass) | | | 100 | 100 | 100 | 100 |
| F | 1 | 1-hydroxycyclohexylphenyl ketone | | | | 10 |

TABLE 2-continued

|  |  |  | Example | | | |
|---|---|---|---|---|---|---|
| Component | | Name of Component | 5 | 6 | 7 | 8 |
| | 2 | 2-dimethylamino-2-2(4-methylbenzyl)-1-(4-morpholin-4-yl-phenyl)butan-1-one | 10 | 10 | | 10 |
| | 3 | Oligo[2-hydroxy-2-methyl-1-[4-(1-methylvinyl)phenyl]propanone | | | | |
| Colorant | | Carbon black | 4 | 4 | 4 | 4 |
| Substrate | | | PC | PC | PMMA | PC |
| Evaluation result | | Adhesion (15 seconds later UV radiation, curing) (number) | 100 A | 100 A | 100 A | 100 A |
| | | Adhesion (5 seconds later UV radiation, curing) (number) | 100 A | 100 A | 100 A | 100 A |
| | | Pencil hardness | HB | F | F | HB |
| | | Stretchability | 3 | 3 | 3 | 3 |
| | | Punching processability | A | A | A | A |
| | | Substrate dissolubility (15 seconds) | A | A | A | A |
| | | Substrate dissolubility (1 second) | C | C | C | A |
| | | Viscosity 25° C. (mPa · s) | 15 | 34 | 30 | 33 |
| | | Viscosity 60° C. (mPa · s) | 5 | 12 | 10 | 12 |

TABLE 3

|  |  |  | Example | | | |
|---|---|---|---|---|---|---|
| Component | | Name of Component | 9 | 10 | 11 | 12 |
| A | 1 | Adamantly methacrylate | | | | |
| | 2 | Adamantly acrylate | | | | |
| | 3 | Isobornyl acrylate | 60 | 35 | | |
| | 4 | Hydroxyethyl acrylamide | | 10 | | |
| A' | 1 | 1,3-butylene glycol diacrylate | | | | |
| B | 1 | Cyclohexyl methacrylate | | | | |
| | 2 | Tetrahydrofurfuryl methacrylate | | | | |
| | 3 | Cyclohexyl acrylate | | 55 | | |
| | 4 | Benzyl acrylate | | | | |
| | 5 | (2-methyl-2-ethyl-1,3-dioxoran-4-yl)methyl acrylate | | | | |
| | 6 | Tetrahydrofurfuryl acrylate | | | | 40 |
| C | 1 | Dimethylaminopropyl acrylamide | | | 10 | |
| | 2 | Acryloyl morpholine | 40 | | 90 | 60 |
| C' | 1 | 3,3,5-trimethylcyclohexane acrylate | | | | |
| D | 1 | 4-hydroxybutyl acrylate | | | | |
| E | 1 | 1,9-nonanediol diacrylate | | | | |
| | 2 | Diethylene glycol diacrylate | | | | |
| Total of monomers (% by mass) | | | 100 | 100 | 100 | 100 |
| F | 1 | 1-hydroxycyclohexylphenyl ketone | 10 | 10 | | |
| | 2 | 2-dimethylamino-2-2(4-methylbenzyl)-1-(4-morpholin-4-yl-phenyl)butan-1-one | | | 10 | 10 |
| | 3 | Oligo[2-hydroxy-2-methyl-1-[4-(1-methylvinyl)phenyl]propanone | | | | |
| Colorant | | Carbon black | 4 | 4 | 4 | 4 |
| Substrate | | | PC | PC | PC | PC |
| Evaluation result | | Adhesion (15 seconds later UV radiation, curing) (number) | 100 A | 100 A | 100 A | 100 A |
| | | Adhesion (5 seconds later UV radiation, curing) (number) | 80 B | 70 B | 90 B | 100 A |
| | | Pencil hardness | H | F | H | F |
| | | Stretchability | 3 | 3 | 3 | 3 |
| | | Punching processability | B | A | A | A |
| | | Substrate dissolubility (15 seconds) | A | A | A | A |
| | | Substrate dissolubility (1 second) | C | C | B | A |
| | | Viscosity 25° C. (mPa · s) | 9 | 34 | 23 | 10 |
| | | Viscosity 60° C. (mPa · s) | 3 | 12 | 8 | 3 |

TABLE 4

| Component | | Name of Component | Example 13 | Example 14 | Example 15 | Example 16 |
|---|---|---|---|---|---|---|
| A | 1 | Adamantly methacrylate | | | | |
| | 2 | Adamantly acrylate | | | | |
| | 3 | Isobornyl acrylate | 50 | | | |
| | 4 | Hydroxyethyl acrylamide | | | | |
| A' | 1 | 1,3-butylene glycol diacrylate | | | | |
| B | 1 | Cyclohexyl methacrylate | | | | |
| | 2 | Tetrahydrofurfuryl methacrylate | 50 | | | |
| | 3 | Cyclohexyl acrylate | | | | |
| | 4 | Benzyl acrylate | | 55 | | |
| | 5 | (2-methyl-2-ethyl-1,3-dioxoran-4-yl) methyl acrylate | | | | |
| | 6 | Tetrahydrofurfuryl acrylate | | | | 55 |
| C | 1 | Dimethylaminopropyl acrylamide | | | | 5 |
| | 2 | Acryloyl morpholine | | 40 | 95 | 35 |
| C' | 1 | 3,3,5-trimethylcyclohexane acrylate | | | | |
| D | 1 | 4-hydroxybutyl acrylate | | | | |
| E | 1 | 1,9-nonanediol diacrylate | | 5 | 5 | |
| | 2 | Diethylene glycol diacrylate | | | | 5 |
| Total of monomers (% by mass) | | | 100 | 100 | 100 | 100 |
| F | 1 | 1-hydroxycyclohexylphenyl ketone | | 10 | 10 | 10 |
| | 2 | 2-dimethylamino-2-2(4-methylbenzyl)-1-(4-morpholuv4-yl-phenyl) butan-1-one | | | | |
| | 3 | Oligo[2-hydroxy-2-methyl-1-[4-(1-methylvinyl)phenyl]propanone | 10 | | | |
| Colorant | | Carbon black | 4 | 4 | 4 | 4 |
| Substrate | | | PC | PC | PC | PC |
| Evaluation result | | Adhesion (15 seconds later UV radiation, curing) (number) | 100 A | 100 A | 100 A | 100 A |
| | | Adhesion (5 seconds later UV radiation, curing) (number) | 100 A | 100 A | 100 A | 100 A |
| | | Pencil hardness | F | HB | F | HB |
| | | Stretchability | 3 | 2.5 | 2.5 | 2.5 |
| | | Punching processability | A | A | A | A |
| | | Substrate dissolubility (15 seconds) | A | A | A | A |
| | | Substrate dissolubility (1 second) | A | A | B | A |
| | | Viscosity 25° C. (mPa · s) | 8 | 9 | 11 | 12 |
| | | Viscosity 60° C. (mPa · s) | 3 | 3 | 4 | 4 |

TABLE 5

| Component | | Name of Component | Example 17 | Example 18 |
|---|---|---|---|---|
| A | 1 | Adamantly methacrylate | | |
| | 2 | Adamantly acrylate | | |
| | 3 | Isobornyl acrylate | | |
| | 4 | Hydroxyethyl acrylamide | | |
| A' | 1 | 1,3-butylene glycol diacrylate | | |
| B | 1 | Cyclohexyl methacrylate | | |
| | 2 | Tetrahydrofurfuryl methacrylate | | |
| | 3 | Cyclohexyl acrylate | | |
| | 4 | Benzyl acrylate | | 30 |
| | 5 | (2-methyl-2-ethyl-1,3-dioxoran-4-yl) methyl acrylate | | |
| | 6 | Tetrahydrofurfuryl acrylate | 10 | |
| C | 1 | Dimethylaminopropyl acrylamide | 5 | |
| | 2 | Acryloyl morpholine | 80 | 70 |
| C' | 1 | 3,3,5-trimethylcyclohexane acrylate | | |
| D | 1 | 4-hydroxybutyl acrylate | | |
| E | 1 | 1,9-nonanediol diacrylate | | |
| | 2 | Diethylene glycol diacrylate | 5 | |
| Total of monomers (% by mass) | | | 100 | 100 |
| F | 1 | 1-hydroxycyclohexylphenyl ketone | 10 | 10 |
| | 2 | 2-dimethylamino-2-2(4-methylbenzyl)-1-(4-morpholin-4-yl-phenyl) butan-1-one | | |
| | 3 | Oligo[2-hydroxy-2-methyl-1-[4-(1-methylvinyl)phenyl]propanone | | |
| Colorant | | Carbon black | 4 | |
| Substrate | | | PC | PC |
| Evaluation result | | Adhesion (15 seconds later UV radiation, curing) (number) | 100 A | 100 A |
| | | Adhesion (5 seconds later UV radiation, curing) (number) | 100 A | 100 A |
| | | Pencil hardness | F | HB |
| | | Stretchability | 2.5 | 3 |
| | | Punching processability | A | A |
| | | Substrate dissolubility (15 seconds) | A | A |
| | | Substrate dissolubility (1 second) | A | A |
| | | Viscosity 25° C. (mPa · s) | 15 | 11 |
| | | Viscosity 60° C. (mPa · s) | 5 | 4 |

TABLE 6

| Component | | Name of Component | Comparative Example 1 | Comparative Example 2 | Comparative Example 3 | Comparative Example 4 |
|---|---|---|---|---|---|---|
| A | 1 | Adamantly methacrylate | | | | |
| | 2 | Adamantly acrylate | | | | |
| | 3 | Isobornyl acrylate | | | | 100 |
| | 4 | Hydroxyethyl acrylamide | | | | |
| A' | 1 | 1,3-butylene glycol diacrylate | | | 50 | |
| B | 1 | Cyclohexyl methacrylate | 50 | | | |
| | 2 | Tetrahydrofurfuryl methacrylate | 50 | | | |
| | 3 | Cyclohexyl acrylate | | | | |
| | 4 | Benzyl acrylate | | 85 | | |
| | 5 | (2-methyl-2-ethyl-1,3-dioxoran-4-yl) methyl acrylate | | | 50 | |
| | 6 | Tetrahydrofurfuryl acrylate | | | | |
| C | 1 | Dimethylaminopropyl acrylamide | | | | |
| | 2 | Acryloyl morpholine | | | | |
| C' | 1 | 3,3,5-trimethylcyclohexane acrylate | | | | |
| D | 1 | 4-hydroxybutyl acrylate | | | | |
| E | 1 | 1,9-nonanediol diacrylate | | | | |
| | 2 | Diethylene glycol diacrylate | | 15 | | |
| Total of monomers (% by mass) | | | 100 | 100 | 100 | 100 |
| F | 1 | 1-hydroxycyclohexylphenyl ketone | 10 | | | 10 |
| | 2 | 2-dimethylamino-2-2(4-methylbenzyl)-1-(4-morpholin-4-yl-phenyl)butan-1-one | | | | |
| | 3 | Oligo[2-hydroxy-2-methyl-1-[4-(1-methylvinyl)phenyl]propanone | | 10 | 10 | |
| Colorant | | Carbon black | 4 | 4 | 4 | 4 |
| Substrate | | | PC | PC | PC | PC |
| Evaluation result | | Adhesion (15 seconds later UV radiation, curing) (number) | 100 A | 100 A | 70 B | 0 C |
| | | Adhesion (5 seconds later UV radiation, curing) (number) | 100 A | 100 A | 50 C | 0 C |
| | | Pencil hardness | B | F | B | H |
| | | Stretchability | 3 | 1 | 1 | 3 |
| | | Punching processability | A | A | A | C |
| | | Substrate dissolubility (15 seconds) | A | A | A | C |
| | | Substrate dissolubility (1 second) | A | A | C | C |
| | | Viscosity 25° C. (mPa · s) | 9 | 12 | 10 | 9 |
| | | Viscosity 60° C. (mPa · s) | 4 | 4 | 3 | 3 |

TABLE 7

| Component | | Name of Component | Comparative Example 5 |
|---|---|---|---|
| A | 1 | Adamantly methacrylate | |
| | 2 | Adamantly acrylate | |
| | 3 | Isobornyl acrylate | |
| | 4 | Hydroxyethyl acrylamide | |
| A' | 1 | 1,3-butylene glycol diacrylate | |
| B | 1 | Cyclohexyl methacrylate | |
| | 2 | Tetrahydrofurfuryl methacrylate | |
| | 3 | Cyclohexyl acrylate | |
| | 4 | Benzyl acrylate | |
| | 5 | (2-methyl-2-ethyl-1,3-dioxoran-4-yl) methyl acrylate | |
| | 6 | Tetrahydrofurfuryl acrylate | 50 |
| C | 1 | Dimethylaminopropyl acrylamide | |
| | 2 | Acryloyl morpholine | |
| C' | 1 | 3,3,5-trimethylcyclohexane acrylate | 50 |
| D | 1 | 4-hydroxybutyl acrylate | |
| E | 1 | 1,9-nonanediol diacrylate | |
| | 2 | Diethylene glycol diacrylate | |
| Total of monomers (% by mass) | | | 100 |
| F | 1 | 1-hydroxycyclohexylphenyl ketone | 10 |
| | 2 | 2-dimethylamino-2-2(4-methylbenzyl)-1-(4-morpholin-4-yl-phenyl)butan-1-one | |
| | 3 | Oligo[2-hydroxy-2-methyl-1-[4-(1-methylvinyl)phenyl]propanone | |
| Colorant | | Carbon black | 4 |
| Substrate | | | PC |
| Evaluation result | | Adhesion (15 seconds later UV radiation, curing) (number) | 0 C |
| | | Adhesion (5 seconds later UV radiation, curing) (number) | 0 C |
| | | Pencil hardness | B |
| | | Stretchability | 3 |
| | | Punching processability | A |
| | | Substrate dissolubility (15 seconds) | A |
| | | Substrate dissolubility (1 second) | A |
| | | Viscosity 25° C. (mPa · s) | 9 |
| | | Viscosity 60° C. (mPa · s) | 3 |

The details of the (A) to (F) components and carbon black in Tables 1 to 7 are as follows.

—(A) First Monomer (Monomer a Homopolymer of which has Tg of 90° C. Or Higher)—
A1: adamantyl methacrylate (Tg: 250° C.)
A2: adamantyl acrylate (Tg: 153° C.)
A3: isobornylacrylate (Tg: 97° C.)
A4: hydroxyethylacrylamide (Tg: 98° C.)
(Comparative Monomer)
A'1: 1,3-butylene glycol diacrylate (Tg: 85° C.)
—(B) Second Monomer (Monomer Capable of Dissolving Substrate)—
B1: cyclohexyl methacrylate
B2: tetrahydrofurfuryl methacrylate
B3: cyclohexyl acrylate
B4: benzyl acrylate
B5: (2-methyl-2-ethyl-1,3-dioxolan-4-yl)methylacrylate (MEDOL-10, manufactured by Osaka Organic Chemical Industry Ltd.)
B6: tetrahydrofurfuryl acrylate
—(C) Third Monomer (Monomer a Homopolymer of which has Tg of 90° C. Or Higher, and which is Capable of Dissolving a Substrate)—
C1: dimethylaminopropylacrylamide (Tg=134° C.)
C2: acryloylmorpholine (Tg=140° C.)
(Comparative Monomer)
C'1: 3,3,5-trimethylcyclohexane acrylate (Tg=81° C.)
—(D) Monofunctional Polymerizable Monomer Containing Hydroxyl Group—
D1: 4-hydroxybutyl acrylate
—(E) Polyfunctional Monomer—
E1: 1,9-nonanediol diacrylate
E2: diethylene glycol diacrylate (Tg: 100° C.)
—(F) Photopolymerization Initiator—
F1: 1-hydroxycyclohexylphenyl ketone
F2: 2-dimethylamino-2-(4-methylbenzyl)-1-(4-morpholin-4-yl-phenyl)butan-1-one
F3: oligo[2-hydroxy-2-methyl-1-[4-(1-methylvinyl)phenyl]propanone
—Carbon Black—

A blended amount of the carbon black was depicted in a state where the carbon black contained carbon black #10 manufactured by Mitsubishi Chemical Corporation and a high molecular weight dispersing agent S32000 manufactured by Lubrizol Japan Co. with a mass ratio of 3:1.

—Substrate—
PC polycarbonate
PMMA: polymethyl methacrylate

The embodiments of the present invention are, for example, as follows:

<1> An active energy ray-curable ink, including:
polymerizable compounds,
wherein the polymerizable compounds contain a monofunctional polymerizable monomer a homopolymer of which has glass transition temperature of 90° C. or higher, and
wherein a cured product obtained by forming a coating film having an average thickness of 10 μm on a polycarbonate substrate using the active energy ray-curable ink, and 15 seconds later, and applying active energy rays having a light quantity of 1,500 mJ/cm$^2$ to the coating film to cure satisfies the following conditions (1) and (2):
(1) a stretchability of the cured product, which is represented by the following equation, is 2 or greater, when the cured product is stretched by means of a tensile tester at a tensile speed of 20 mm/min, and temperature of 180° C., and Stretchability=(length after a tensile test)/(length before the tensile test)

(2) adhesion between the polycarbonate substrate and the cured product as measured by a cross-cut test in accordance with JIS K5400 is 70 or greater.

<2> The active energy ray-curable ink according to <1>, wherein the monofunctional polymerizable monomer has a cyclic structure.

<3> The active energy ray-curable ink according to <1> or <2>, wherein the monofunctional polymerizable monomer is a monomer containing a hydroxyl group, and an amount of the monomer containing a hydroxyl group is 15% by mass or less relative to a total amount of the polymerizable compounds.

<4> The active energy ray-curable ink according to any one of <1> to <3>, wherein the polymerizable compounds contain a combination of a first monomer a homopolymer of which has glass transition temperature of 90° C. or higher, and a second monomer capable of dissolving the polycarbonate substrate, or the polymerizable compounds contain a third monomer a homopolymer of which has glass transition temperature of 90° C. or higher, and which is capable of dissolving the polycarbonate substrate.

<5> The active energy ray-curable ink according to <4>, wherein the first monomer is hydroxyethyl(meth)acrylamide, isobornyl (meth)acrylate, adamantyl (meth)acrylate, dicyclopentenyl (meth)acrylate, dicyclopentanyl (meth)acrylate, or dicyclopentenyloxyethyl (meth)acrylate, or any combination thereof.

<6> The active energy ray-curable ink according to <4> or <5>, wherein the second monomer is tetrahydrofurfuryl (meth)acrylate, cyclohexyl (meth)acrylate, benzyl (meth)acrylate, (meth)acryloylmorpholine, dimethylaminopropyl (meth)acrylamide, (cyclohexanespiro-2-(1,3-dioxolan-4-yl)) methylacrylate, or (2-methyl-2-ethyl-1,3-dioxolan-4-yl) methylacrylate, or any combination thereof.

<7> The active energy ray-curable ink according to any one of <1> to <6>, wherein the active energy ray-curable ink is an inkjet ink, is free from a diluent solvent, and has a viscosity of 3 mPa·s to 40 mPa·s at 25° C., or 7 mPa·s to 15 mPa·s at 60° C.

<8> The active energy ray-curable ink according to any one of <1> to <7>, wherein the polymerizable compounds consist of monofunctional polymerizable monomers.

<9> The active energy ray-curable ink according to any one of <4> to <8>, wherein an amount of the first monomer is 50% by mass or greater relative to a total amount of the polymerizable compounds.

<10> The active energy ray-curable ink according to any one of <4> to <9>, wherein an amount of the second monomer is 30% by mass or greater relative to a total amount of the polymerizable compounds.

<11> The active energy ray-curable ink according to any one of <4> to <10>, wherein the polymerizable compounds contain the third monomer, an amount of the monofunctional polymerizable monomer a homopolymer of which has glass transition temperature of 90° C. or higher is 50% by mass or greater relative to a total amount of the polymerizable compounds, and an amount of the monofunctional polymerizable monomer capable of dissolving the polycarbonate substrate is 30% by mass or greater relative to the total amount of the polymerizable compounds.

<12> The active energy ray-curable ink according to any one of <1> to <11>, wherein the active energy ray-curable ink is capable of dissolving the polycarbonate substrate.

<13> An image or cured product forming method, including:
ejecting an active energy ray-curable ink onto a surface of a substrate through an inkjet recording system; and
applying active energy rays to the active energy ray-curable ink ejected onto the surface of the substrate to cure the active energy ray-curable ink,
wherein the active energy ray-curable ink is the active energy ray-curable ink according to any one of <1> to <12>.
<14> An ink cartridge, including:
the active energy ray-curable ink according to any one of <1> to <12>; and
a container housing the active energy ray-curable ink.
<15> An image or cured product forming device, containing:
an ink ejecting unit configured to eject an active energy ray-curable ink onto a surface of a substrate through an inkjet recording system;
a curing unit configured to apply active energy rays to the active energy ray-curable ink ejected onto the surface of the substrate, to thereby cure the active energy ray-curable ink; and
the ink cartridge according to <14>.
<16> An image or cured product, which is formed with the active energy ray-curable ink according to any one of <1> to <12>.

This application claims priority to Japanese application No. 2013-191371, filed on Sep. 17, 2013 and Japanese application No. 2014-139483, filed on Jul. 7, 2014, and incorporated herein by reference.

What is claimed is:

1. An active energy ray-curable ink comprising polymerizable compounds, wherein the polymerizable compounds comprise a monofunctional polymerizable monomer, and
the monofunctional polymerizable monomer comprises either (i) a combination of a first monomer, a homopolymer of which has glass transition temperature of 90° C. or higher, and a second monomer capable of dissolving a polycarbonate substrate, or (ii) a third monomer, a homopolymer of which has glass transition temperature of 90° C. or higher, and which is capable of dissolving a polycarbonate substrate, or both (i) and (ii), and
the amount of the first monomer is 40% by mass or greater relative to the total amount of the polymerizable compounds.

2. The active energy ray-curable ink according to claim 1, wherein the amount of the second monomer is 30% by mass or greater relative to the total amount of the polymerizable compounds.

3. The active energy ray-curable ink according to claim 1, wherein the polymerizable compounds contain both (i) and (ii).

4. The active energy ray-curable ink according to claim 1, wherein the polymerizable compounds contain (ii).

5. The active energy ray-curable ink according to claim 1, wherein the polymerizable compounds contain (i).

6. The active energy ray-curable ink according to claim 1, wherein the monofunctional polymerizable monomer has a cyclic structure.

7. The active energy ray-curable ink according to claim 1, wherein the amount of a monomer containing a hydroxyl group as the monofunctional polymerizable monomer is 15% by mass or less relative to the total amount of the polymerizable compounds.

8. The active energy ray-curable ink according to claim 1, wherein the first monomer comprises at least one selected from hydroxyethyl(meth)acrylamide, isobornyl (meth)acrylate, adamantyl (meth)acrylate, dicyclopentenyl (meth)acrylate, dicyclopentanyl (meth)acrylate, dicyclopentenyloxyethyl (meth)acrylate, (meth)acryloylmorpholine, and dimethylaminopropyl(meth)acrylamide.

9. The active energy ray-curable ink according to claim 1, wherein the second monomer comprises at least one selected from tetrahydrofurfuryl (meth)acrylate, cyclohexyl (meth)acrylate, benzyl (meth)acrylate, (meth)acryloylmorpholine, dimethylaminopropyl(meth)acrylamide, (cyclohexanespiro-2-(1,3-dioxolan-4-yl))methylacrylate, (2-methyl-2-ethyl-1,3-dioxolan-4-yl)methylacrylate.

10. The active energy ray-curable ink according to claim 1, wherein the third monomer comprises at least one selected from (meth)acryloylmorpholine and dimethylaminopropyl (meth)acrylamide.

11. The active energy ray-curable ink according to claim 1, wherein the polymerizable compounds contain a polyfunctional monomer.

12. The active energy ray-curable ink according to claim 1, wherein the polymerizable compounds contain an oligomer.

13. The active energy ray-curable ink according to claim 1, wherein the polymerizable compounds contain a urethane oligomer whose weight average molecular weight is 5,000 to 13,000.

14. The active energy ray-curable ink according to claim 1, wherein the active energy ray-curable composition is free from a diluent solvent, and the viscosity of the active energy ray-curable composition is 3 mPa·s to 40 mPa·s at 25° C. or 7 mPa·s to 15 mPa·s at 60° C.

15. The active energy ray-curable ink according to claim 1, wherein a cured product obtained by forming a coating film having an average thickness of 10 μm on a polycarbonate substrate using the active energy ray-curable composition, and 15 seconds later applying active energy rays having a light quantity of 1,500 mJ/cm$^2$ to the coating film to cure satisfies the following condition (1):
(1) a stretchability of the cured product, which is represented by the following equation: Stretchability=(length after a tensile test)/(length before the tensile test), is 2.5 or greater, when the cured product is stretched by means of a tensile tester at a tensile speed of 20 mm/min, and temperature of 180° C.

16. The active energy ray-curable ink according to claim 1, wherein a cured product obtained by forming a coating film having an average thickness of 10 μm on a polycarbonate substrate using the active energy ray-curable composition, and 5 seconds later applying active energy rays having a light quantity of 1,500 mJ/cm$^2$ to the coating film to cure satisfies the following condition (2):
(2) adhesion between the polycarbonate substrate and the cured product as measured by a cross-cut test in accordance with JIS K5400 is 70 or greater.

17. The active energy ray-curable ink according to claim 1, wherein a cured product obtained by forming a coating film having an average thickness of 10 μm on a polycarbonate substrate using the active energy ray-curable composition, and 15 seconds later applying active energy rays having a light quantity of 1,500 mJ/cm$^2$ to the coating film to cure satisfies the following condition (3):
(3) pencil hardness of the cured product as measured in accordance with the scratch hardness method (pencil method) as specified in JIS K5600-5-4 is F or greater.

18. The active energy ray-curable ink according to claim 1, wherein the active energy ray-curable composition is an inkjet ink.

19. A ink-filled container, comprising:
an active energy ray-curable ink according to claim 1; and
a container in which the active energy ray-curable ink is housed.

20. An image or cured product forming device, comprising:
an ink-filled container according to claim 19; and
active energy ray irradiating means to cure the active energy ray-curable ink.

* * * * *